(12) United States Patent
Cooper

(10) Patent No.: US 10,999,968 B1
(45) Date of Patent: *May 11, 2021

(54) UNDERGROUND FERTILIZING SYSTEM FOR IRRIGATION SYSTEM

(71) Applicant: Danny Cooper, Fort Worth, TX (US)

(72) Inventor: Danny Cooper, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,394

(22) Filed: Aug. 6, 2019

Related U.S. Application Data

(63) Continuation-in-part of application No. 16/115,095, filed on Aug. 28, 2018, now Pat. No. 10,368,482, which is a continuation-in-part of application No. 15/271,335, filed on Sep. 21, 2016, now Pat. No. 10,058,026.

(51) Int. Cl.
| | | |
|---|---|---|
| *A01C 23/04* | (2006.01) | |
| *A01G 17/00* | (2006.01) | |
| *A01C 21/00* | (2006.01) | |
| *A01C 23/00* | (2006.01) | |
| *A01G 13/00* | (2006.01) | |

(52) U.S. Cl.
CPC ............ *A01C 23/047* (2013.01); *A01C 21/00* (2013.01); *A01C 23/008* (2013.01); *A01G 17/005* (2013.01); *A01G 2013/004* (2013.01)

(58) Field of Classification Search
CPC .... A01C 23/042; A01C 23/047; A01G 25/16; A01G 25/00
See application file for complete search history.

(56) References Cited

U.S. PATENT DOCUMENTS

| | | | |
|---|---|---|---|
| 3,669,357 | A | 6/1972 | Overbey |
| 3,797,740 | A | 3/1974 | Kah, Jr. |
| 4,852,802 | A | 8/1989 | Iggulden et al. |
| 4,870,991 | A | 10/1989 | McMillan et al. |
| 4,971,248 | A | 11/1990 | Marino |
| 5,022,585 | A | 6/1991 | Burgess |
| 5,092,556 | A | 3/1992 | Darling et al. |
| 5,234,286 | A | 8/1993 | Wagner |
| 5,303,729 | A | 4/1994 | DeMarco |
| 5,366,159 | A | 11/1994 | Childers |
| 5,730,364 | A | 3/1998 | Gertie |
| 5,772,115 | A | 6/1998 | Vaughn |
| 5,775,593 | A | 7/1998 | Delorme et al. |
| 5,836,518 | A | 11/1998 | Jester |
| 5,908,157 | A | 6/1999 | Antonellis et al. |
| 7,638,064 | B1 | 12/2009 | Miller et al. |

(Continued)

FOREIGN PATENT DOCUMENTS

JP 2000350549 A 12/2000

OTHER PUBLICATIONS

US 5,779,608 A, 07/1998, Elliott, Jr. (withdrawn)

(Continued)

*Primary Examiner* — Carib A Oquendo
(74) *Attorney, Agent, or Firm* — James E. Walton

(57) ABSTRACT

A system and method for applying hydro-mulch and hydro-seed products stored underground through an irrigation system includes a first irrigation system, a second irrigation system, and a storage tank at least partially located underground, the storage tank being in fluid connection with the second irrigation system, wherein the storage tank is configured for storing and supplying the hydro-mulch and hydro-seed products to the second irrigation system.

4 Claims, 3 Drawing Sheets

(56) References Cited

U.S. PATENT DOCUMENTS

| | | |
|---|---|---|
| 8,191,307 B2 | 6/2012 | Donoghue et al. |
| 8,297,535 B1 | 10/2012 | Reid |
| 8,342,427 B1 | 1/2013 | Jivanjee, Jr. |
| 10,368,482 B1 | 8/2019 | Cooper |
| 2004/0049978 A1 | 3/2004 | Lips, II et al. |
| 2006/0027676 A1 | 2/2006 | Buck et al. |
| 2007/0290072 A1 | 12/2007 | Smith |
| 2009/0060659 A1 | 3/2009 | Wallace |
| 2010/0222932 A1 | 9/2010 | O'Connor |
| 2014/0346099 A1 | 11/2014 | Brantley et al. |

OTHER PUBLICATIONS

Office Action dated Mar. 30, 2017 for U.S. Appl. No. 15/271,335.
Amendment filed Jun. 29, 2017 for U.S. Appl. No. 15/271,335.
Final Office Action dated Sep. 7, 2017 for U.S. Appl. No. 15/271,335.
Amendment After Final filed Nov. 7, 2017 for U.S. Appl. No. 15/271,335.
Office Action dated Feb. 20, 2018 for U.S. Appl. No. 15/271,335.
Amendment filed May 21, 2018 for U.S. Appl. No. 15/271,335.
Notice of Allowance dated Mar. 26, 2019 for U.S. Appl. No. 16/115,095.

UNDERGROUND FERTILIZING SYSTEM FOR IRRIGATION SYSTEM

This application is a continuation-in part of U.S. patent application Ser. No. 16/115,095, filed 28 Aug. 2018, titled "Underground Fertilizing System for Irrigation System," which is a continuation-in part of U.S. patent application Ser. No. 15/271,335, filed 21 Sep. 2016, titled "Underground Fertilizing System for Irrigation System," both of which are incorporated herein for all purposes.

BACKGROUND

1. Field of the Invention

The present invention relates in general to the field of fertilizer systems, and more specifically to a system for the storage of fertilizer, pesticides, and other agricultural products below ground and the utilization of an in-ground spraying system for the application of said fertilizer, pesticides, and other agricultural products.

2. Description of Related Art

Lawns, pastures, home sites, and such require the application of fertilizer and other agricultural products to improve the quality of the grasses and plants located in the lawn. Conventional fertilizers are granular and are spread with drop or broadcast spreaders to cover the desired area. Additionally, there are conventional systems for spreading liquid fertilizers that require a user to spray the liquid fertilizer in the desired areas. All of these conventional systems have the requirement that the user apply the fertilizer directly, for example, by pushing the spreader, attaching the spreader to a vehicle, or walking and spraying at the same time. The application of fertilizer directly to the desired areas requires considerable time to distribute the fertilizer. Additionally, the user is needlessly exposed to the dangerous fertilizer by being in close proximity to the fertilizer while being distributed. While there are many ways to apply fertilizer and other agricultural products known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
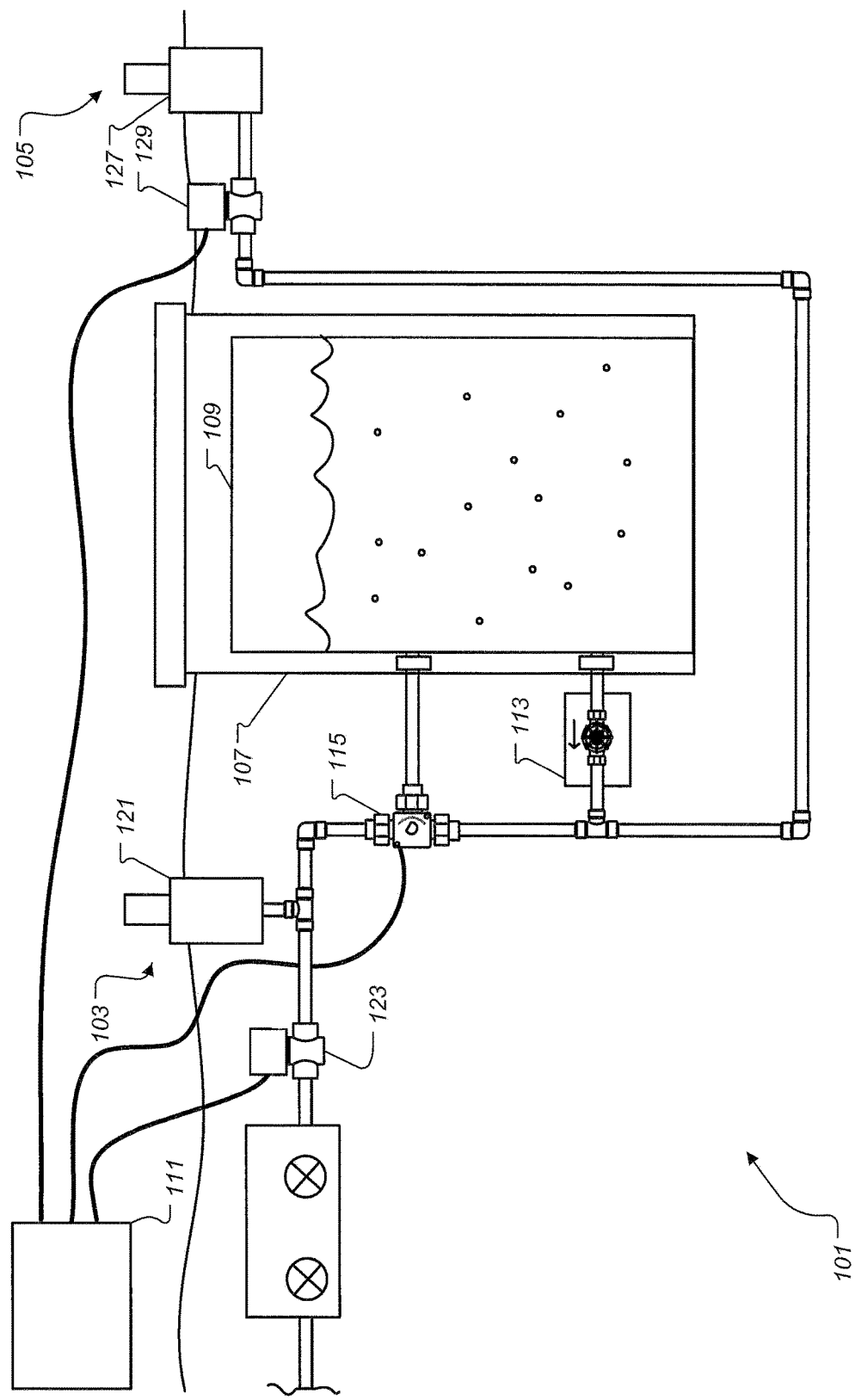
FIG. 1 is a plan view of an underground fertilizing system for irrigation systems according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of underground fertilizing systems for irrigation systems are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, a preferred embodiment of underground fertilizing system for irrigation system according to the present application is illustrated. Underground system 101 is comprised of a first irrigation system 103, a second irrigation system 105, a tank holder 107, a tank 109, a controller 111, a one-way check valve 113, a three way valve 115, and various pipes and fittings to couple the various elements together to allow fluid to transfer from the water supply and the tank through the system and out the first and second irrigation systems. While conventional pipes and fittings can be utilized for both the first and second irrigation system, identifiable pipes are preferred for those locations capable of transporting fertilizer. For example, the fertilizer plumbing can be colored green instead of white to indicate the contents of the pipe.

First irrigation system 103 is comprised of a plurality sprinkler heads, such as sprinkler head 121, and a plurality of valves, such as valve 123, for controlling water flow to various stations. Second irrigation system 105 is comprised of a plurality of sprinkler heads, such as sprinkler head 127, and a plurality of valves, such as valve 129, for controlling the flow of fluid, for example, liquid fertilizer, to various stations. First irrigation system 103 is configured for suppling water to an agricultural area. Second irrigation system 105 is configured for suppling water, liquid fertilizer, and/or other fluids, including insecticide, as will be explained below, to an agricultural area located adjacent the irrigation system. While the preferred underground system is installed initially as a multi-system installation, it will be appreciated that components of the system may be added to existing irrigation systems to provide the ability to distribute water, liquid fertilizer, and/or other chemicals to a selected agricultural areas.

System 101 operates by controller 111 controlling valves 123 for allowing water to flow through the system. For example, the three way valve 115 selectively controls water flow into the tank 109 and thereby water flow out of the tank through the one way valve 113. Water out of the tank now includes fertilizer for distribution though the second irrigation system. Controller 111 can operate three way valve 115 to stop the flow of water into the tank 109 and flush any remaining fertilizer from the second irrigation system 105. Tank 109 preferably contains premixed liquid fertilizer configured to be sprayed from the second irrigation system 105. Tank 109 is removable and replaceable with other tanks containing premixed liquid fertilizer and/or other chemicals. Alternatively, tank 109 contains concentrated liquid fertilizer or other chemicals configured to be mixed with water and then sprayed from the second irrigation system 105.

Controller 111 is preferably a programmable microprocessor based system for allowing a user to regulate water flow through the system onto the lawn. The user can control the various zones and the amount of water and fertilizer each zone receives by programming controller 111. Furthermore, in retrofit systems controller 111 can be wired into existing sprinkler controllers, either as an operational zone, or as an accompanying system. It should be understood that all controllers 111 may be programmed in unison or separately. In addition, it is preferred that controllers 111 be programmed and/or equipped with remote, wireless, and/or cellular communication functionality, to allow controllers 111 to be accessed, programmed, and controlled remotely.

Figure 2:
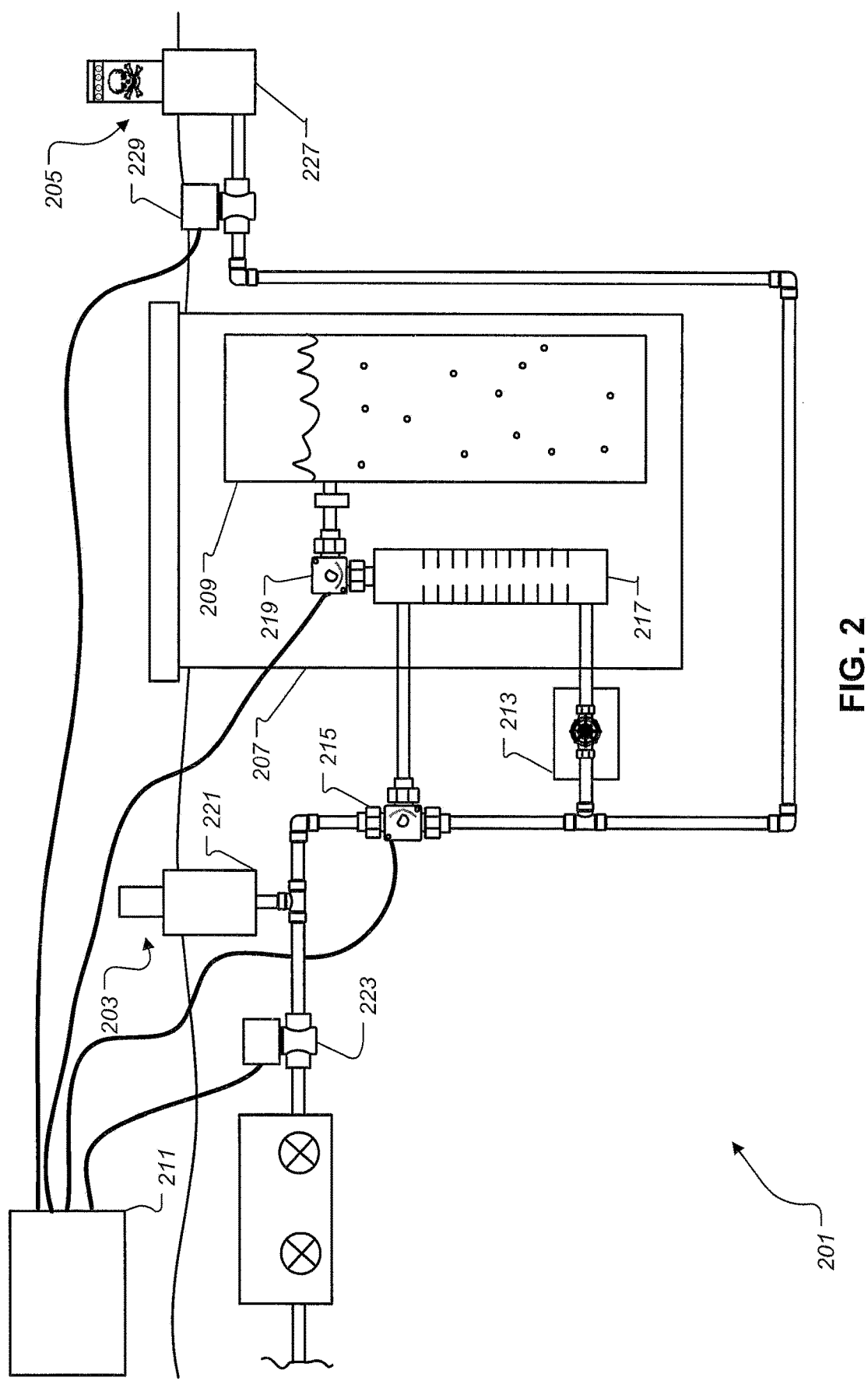
FIG. 2 is a plan view of an alternative underground fertilizing system for irrigation systems according to the present application.

Referring now also to FIG. 2 in the drawings, an alternative embodiment of underground fertilizing system for irrigation system according to the present application is illustrated. Underground system 201 is comprised of a first irrigation system 203, a second irrigation system 205, a tank holder 207, a tank 209, a controller 211, a one-way check valve 213, a three way valve 215, a mixer 217, a metering valve 219, and various pipes and fittings to couple the various elements together to allow fluid to transfer from the water supply and the tank through the system and out the first and second irrigation systems. While conventional pipes and fittings can be utilized for both the first and second irrigation system, identifiable pipes are preferred for those locations capable of transporting fertilizer. For example, the fertilizer plumbing can be colored green and labeled "poison" instead of white to indicate the contents of the pipe.

First irrigation system 203 is comprised of a plurality of conventional sprinkler heads, such as sprinkler heard 221, and a plurality of sprinkler valves, such as sprinkler valve 223. Second irrigation system 205 is comprised of a plurality of improved sprinkler heads, such as sprinkler heads 227, and a plurality of improved valves, such as valves 229. Improved sprinkler head 227 is configured for distributing liquid fertilizer by having a large size, or oversized nozzle element, to prevent clogging due to the additional fertilizer and is clearly identifiable as dangerous. Improved sprinkler head 227 preferably comprises readily identifiable warnings to those near through the use of a selected symbols and/or other alerting devices, such as light emitting diodes (LED), to alert, users to stay away while the system is in operation (and shortly after application of fertilizer and/or chemicals). The LED's can be programmed to only activate upon the spraying of fertilizer through the second irrigation system and/or to stay activated for a selected duration of time after application of the fertilizer. In those embodiments in which sprinkler head 227 includes LED's and/or other electronic devices, sprinkler head 227 may include a battery or other power supply device, such as rechargeable battery and/or a solar powered recharging system. The batteries may also be recharged via a small electricity generation system associated with the fluid flow through the system. Thus, as fluid is flowing through the system, the batteries that operate the LED's and other electrical components are being recharged.

First irrigation system 203 is configured for suppling water to an agricultural area. Second irrigation system 205 is configured for suppling water and/or liquid fertilizer to an agricultural area located adjacent the irrigation system. While the preferred underground system is installed initially as a multi-system installation, it will be appreciated that components of the system may be added to existing irrigation systems to provide the ability to distribute water, liquid fertilizer, and/or other chemicals to a selected agricultural areas. Many different types of nozzles and sprinkler heads are contemplated to be utilized with the systems described herein to spread water and or fertilizer. For example, drip heads can be utilized to precisely apply fertilizer. In addition, elongated leach lines may be added as stations to distribute water, fertilizer, pesticides, insecticides, and/or other chemicals to agricultural areas to treat crops. In those instances where leach lines are utilized, it will be appreciated that the leach lines would be located a selected distance underground to allow the fluids from the system to leach into the ground at a selected rate and depth.

The system 201 operates by the controller 211 controlling valves 221 for allowing water to flow through the system. For example, the three way valve 215 controls water flow into the tank 209 and thereby water flow out of the tank through the one way valve 213. Water out of the tank now includes fertilizer for distribution though the second irrigation system. The controller can operate the three way valve 215 to stop the flow of water into the tank 209 and flush any remaining fertilizer from the second irrigation system 205. Tank 209 contains premixed liquid fertilizer configured to be sprayed from the second irrigation system. Tank 209 is removable and replaceable with another tank containing premixed liquid fertilizer. Alternatively the tank 209 contains concentrated liquid fertilizer configured to be mixed with water in mixer 217 and then sprayed from the second irrigation system 205.

In alternative embodiments, second irrigation system 205 may be configured for distributing hydro-mulch and/or hydro-seed products to the agricultural area. Hydro-mulch and hydro-seed products include a mixture of seeds and fertilizer in a semi-liquid solution that is conventionally distributed through large sprayer systems, usually truck-mounted or trailer-mounted systems, in which the user has to walk through the area dragging large hoses. In these embodiments, the hydro-mulch and hydro-seed products are distributed though second irrigation system 205 in the same manner as the liquid fertilizer. However, due to the added "thickness" and/or consistency of the hydro-mulch and hydro-seed products, the nozzles on sprinkler heads 127 may be adapted to allow the hydro-mulch and hydro-seed products to flow easily therethrough. The hydro-mulch and/or hydro-seed products are placed in tank 109 and distributed as set forth above.

In these embodiments, it may be advantageous to interchange sprinkler heads 127 from hydro-mulch heads/nozzles to fertilizer heads/nozzles. This interchangeability is particularly useful when new lawns are being installed. The hydro-mulch system can be used to initially distribute the hydro-mulch and/or hydro-seed, then, once the lawn is established, the heads and/or nozzles can be interchanged, so that fertilizer can be distributed on the established lawn.

In addition, in these embodiments, in may be desirable to connect second irrigation system to a hydro-mulch and/or hydro-seed source, such as a truck-mounted or trailer mounted pump, as opposed to using tank 109. This allows the hydro-mulch and/or hydro seed to be pumped into and distributed though second irrigation system 205, as opposed to the user having to walk through the agricultural area on foot with large hoses. An adapter may be used to connect the hydro-mulch and/or hydro-seed pump to second irrigation system 205.

Figure 3:
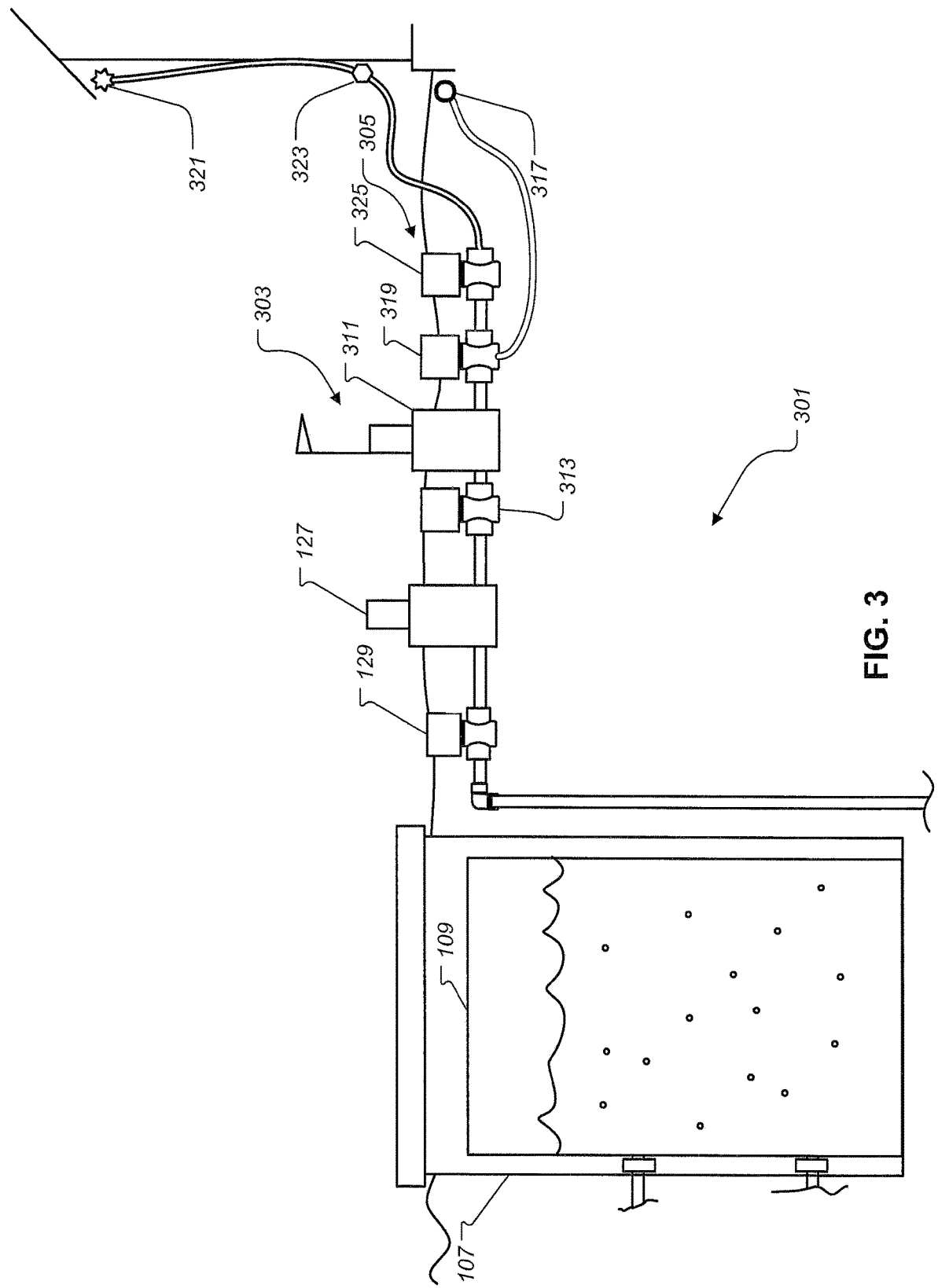
FIG. 3 is a plan view of an alternative underground fertilizing system for irrigation systems according to the present application.

Referring now also to FIG. 3 in the drawings, an alternative embodiment of underground fertilizing system for irrigation system according to the present application is illustrated. System 301 is similar in form and function to system 101, with the exception that system 301 further includes of a third irrigation system 303, a fourth irrigation system 305, and a fifth irrigation system 307.

Third irrigation system 303 is comprised of an improved sprinkler head 311 and an improved valve 313. Improved sprinkler head 311 is configured for distributing liquid fertilizer by being clearly identifiable as dangerous with a flag or marker 312 that either rises and lowers concurrently with the operation of head 311, or that raises when sprinkler head 311 is activated and remains up for a selected amount of time after sprinkler head 311 is deactivated. By flag 312 remaining up for a selected amount of time after system 303 has distributed fertilizer or other chemicals, For example, improved sprinkler head 311 includes readily identifiable warnings to those near through the use of a dangerous symbol or marker, such as flag 312, to alert users to stay away while, or after, system 303 is in operation. Flag 312 may be replaced or enhanced by other types of warning devices that are operably associated with sprinkler head 311. For example, a rotating device that rotates when the sprinkler head is in operation may also be utilized. Rotating warning device may be carried by sprinkler hear 311, and may be driven by the flow of fluid through third irrigation system 303. For example, the rotating warning device could include portions of alternating colors located along the exterior of sprinkler head 311, such as black and white, that attract attention when spinning. The spinning operation may be generated by fins or other actuators associated with sprinkler head 311.

Fourth irrigation system 305 is comprised of an improved drip head 317 and an improved valve 319. Improved drip head 317 is configured for distributing liquid insecticide and/or termiticide underground for subterranean insect extermination. For example, termite poison can be distributed through the system into the ground near a building or dwelling regularly and easily. The pesticide application of the system contains the same tanks, but instead of fertilizer, termiticide is placed in the tanks. With the tanks at a tenth filled with the termiticide water from the irrigation system flows through the tanks around the exterior building or home. Specialized lines are preferably placed around the building or home exterior. These lines have holes positioned around each line to ensure that the proper amount of termiticide is distributed throughout the soil area around building exterior and home exterior for the termite treatment.

Fifth irrigation system 307 is comprised of an improved misting head 321, an improved drip head 323, and an improved valve 325. Improved misting head 321 is configured for distributing liquid insecticide in the air. For example, mosquito repellant can be distributed through the system into the air near a building or dwelling regularly and easily. Improved dripping head 323 is configured for, distributing liquid on a wall. For example, spider insecticide can be distributed through the system onto the walls of a building or dwelling regularly and easily to prevent spiders from nesting.

The system of the present application is an all-in-one irrigation system that illuminates the hard labor of using the push spreaders on commercial and residential properties. In the preferred embodiment, the individual systems are selectively segregated from each other, so that the fluids from one system do not intermingle with the fluids from the other systems, unless the user selectively chooses to do so.

The system lines are preferably about six inches beside the regular irrigation system. The system has the same amount of irrigation lines as the regular system, but the fertilizing tanks and lines are underground. The fertilizing tanks are replaceable and can be flushed out to keep the lines from clogging. This system will be all-inclusive with the sprinkler system and the fertilizing system in one and controlled by a computer, so that they are run simultaneously distributing the precise amount of fertilizer and water. In some embodiments the valves, sprinkler heads, pipes, wires, etc. for the separate systems are placed in the same trenches during installation, when possible, to reduce the amount of labor involved in installing the system. In other embodiments, the valves, sprinkler heads, pipes, wires, etc. for the separate systems are installed in separate sets of trenches.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. An system for distributing liquid agricultural products, comprising:

- a first controller for controlling the system;
- a first irrigation system for supplying water to an agricultural area, the first irrigation system comprising:
  - a first plurality of valves;
  - a first plurality of sprinkler heads; and
  - a first set of pipes for placing the first valves into fluid communication with the first sprinkler heads;
- a second irrigation system for supplying at least one liquid agricultural product to the agricultural area, the second irrigation system comprising:
  - a second plurality of valves;
  - a second plurality of sprinkler heads; and
  - a second set of pipes for placing the second valves into fluid communication with the second sprinkler heads; and
- a storage tank partially located underground, the storage tank being in fluid connection with the second irrigation system via a one-way valve, the storage tank being configured for storing and supplying the at least one liquid agricultural product to the second irrigation system;
- wherein the second set of pipes are isolated from the first set of pipes via a three-way valve, such that the at least one liquid agricultural product in the second set of pipes cannot mix with the water in the first set of pipes.

2. The system according to claim 1, wherein the at least one agricultural product is a hydro-mulch product.

3. The system according to claim 1, wherein the at least one agricultural product is a hydro-seed product.

4. The system according to claim 1, further comprising:

- an adapter operably associated with the second irrigation system for connecting a pump for pumping the at least one agricultural product into and through the second irrigation system.

* * * * *